United States Patent [19]

Fischer

[11] 4,270,310
[45] Jun. 2, 1981

[54] SUPPORT DEVICE FOR AN UPSTANDING PLANT SUPPORT ROD IN A PLANT POT

[76] Inventor: Gerhard M. Fischer, Maxstrasse 55, 8580 Bayreuth, Fed. Rep. of Germany

[21] Appl. No.: 63,136

[22] Filed: Aug. 2, 1979

[30] Foreign Application Priority Data

Aug. 17, 1978 [DE] Fed. Rep. of Germany ....... 2835939

[51] Int. Cl.³ .............................................. A01G 9/12
[52] U.S. Cl. .......................................... 47/70; 47/47; 248/539; 403/357; 403/409
[58] Field of Search .................... 47/47, 70; 248/222.1, 248/221.3, 539, 535, 534, 316 E; 403/409, 357

[56] References Cited

U.S. PATENT DOCUMENTS 2,665,103   1/1954   Flora et al. ...................... 248/539 X

FOREIGN PATENT DOCUMENTS 156676   8/1932   Switzerland ................................ 47/47
301709   9/1954   Switzerland ................................ 47/47
  6431   of 1913   United Kingdom ......................... 47/47

Primary Examiner—Steven A. Bratlie
Attorney, Agent, or Firm—Brady, O'Boyle & Gates

[57] ABSTRACT

A support body portion extends inwardly from the top rim of a plant pot and has a substantially vertical channel therethrough bounded on the outer end by the inner surface of the pot, on the inner end by a rod support groove substantially parallel with the axis of symmetry of the pot and on the sides by a pair of side walls that converge radially inward. A plant support rod is positioned in the rod support groove and extends above the pot a substantial distance so that a plant in the pot can be tied to it for support. A spring wedge having a pair of legs, at the same angle to each other as the angle of the slope of the pot side to the axis of symmetry, joined by a resilient bight portion is pushed down into the top of the vertical channel so one leg bears against the sloping wall of the pot and the other leg bears against the support rod to anchor it firmly in the vertical rod support groove. In one form, the support body portion is formed integrally with the pot and in a modified form it is a separated unit attached to the rim of a pot by hook shaped members.

10 Claims, 6 Drawing Figures

SUPPORT DEVICE FOR AN UPSTANDING PLANT SUPPORT ROD IN A PLANT POT

BACKGROUND OF THE INVENTION

This invention is directed to a device for supporting an upstanding rod in the pot of a potted plant that attains tall growth, so that the plant can be tied for support to the rod or to a trellis supported by the rod. The device of the invention distinguishes itself through moderately priced production and providing a secure support for upstanding support rods of varying cross-sections and diameters.

In order to hold the upstanding support rods of potted plants with tall growth, one prior art device uses a disk, smaller in diameter than the bottom of the pot, and including a slit that runs from the edge of the disk to its center, in addition to a section of support tubing to which the disc is attached. However, when potting the plant the tube must be stuck through the root bulb of the plant, whereby undesired damage to the bulb cannot be prevented.

SUMMARY OF THE INVENTION

The object of the present invention is to provide a plant rod support device that precludes damage to the plant root bulb or the like that is unavoidable with the prior art device.

A rod support body portion extends from the top edge of a plant pot radially inwardly a short distance and terminates somewhat inwardly of the diameter of the bottom of the plant pot. The rod support body portion is comprised of a pair of generally vertical side wall portions extending from the edge of the pot radially inwardly in converging relation to each other and are joined at the inner ends thereof by a bight portion that forms an interior groove or channel or fluted surface in the support body portion that extends vertically parallel with the axis of symmetry of the plant pot. The vertical channel, that is open at both ends, thus formed through the body portion is bounded by the bight portion, the interior sides of the converging side wall portions and the interior side wall of the plant pot that normally extends downwardly and inwardly toward the bottom of the pot.

A springy wedge member, that is of inverted U or noose-shape, has wide leg members dimensioned to fit within the vertical channel formed in the support body portion between the side wall portions. Both leg members have lower free ends and are connected at their tops by a resilient bright portion. The inner leg member extends vertically and is positioned in spaced relation with the vertical inner groove, and the outer leg member extends downwardly and inwardly toward the inner leg member at an acute angle to the axis of the inner leg member that corresponds to the angle of the slanting side wall of the pot relative to the vertical axis of symmetry of the pot. The outer leg member has wedge shaped side extensions for engaging between the side wall portions adjacent to the interior side wall of the pot.

One of the leg members carries on its inner surface a narrow plate extending at right angles therefrom toward the inner surface of the other leg member and terminating a short and equal distance therefrom throughout its length, to limit the distance the two leg members can move toward each other.

In one form of the invention the rod support body portion is formed integral with the plant pot. In another form of the invention for use with existing common plant pots, the side wall portions at the top of their outer edges are provided with hook portions for engaging over the top rim of a plant pot for connecting the rod support body portion thereto in a manner to prevent radial movement of the support body portion relative to the side of the pot.

It is to be understood that interior groove or channel in the support body portion may be at an angle other than vertically oriented, to support a rod or stake at an angle to the pot symmetry axis.

In use the upstanding plant support rod, to which the plant is subsequently tied for support, is inserted in and against the interior groove or channel of the support body portion. The bottom end of the rod may be resting on the bottom of the pot or may be at some distance above the bottom of the pot. The wedge member is then inserted into the vertical channel of the support body portion and pushed down so that the outer surface of the inner leg member engages the side of the support rod away from the interior groove, and the outer surface of the outer leg member bears against the interior sloping surface of the pot wall so that the spring pressure of the springy wedge member anchors the upstanding support rod in the channel of the support body portion.

BRIEF DESCRIPTION OF THE DRAWNGS

The drawings represent, by way of example, two forms of the rod support device according to the invention, in which.

DESCRIPTION OF THE PREFERRED EMBODIMENTS

Figure 1:
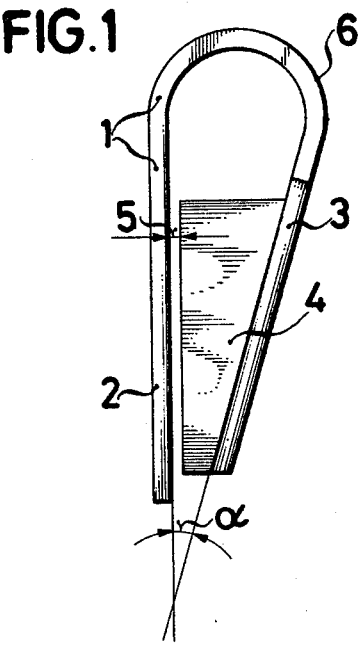
FIG. 1 is a side view of the springy wedge part of the device.

The springy or resilient wedge member 1 according to the invention is of inverted U or noose-shape whose wide and springy legs 2 and 3 curve back toward each other and form an acute angle α therebetween, that corresponds to the slant of the sides of the plant pot with respect to its axis of symmetry S. Inner leg member 2 is preferably straight and adapted to be arranged parallel with the axis of symmetry S of the pot, and outer leg member 3 extends downwardly and inwardly toward inner leg 2 at the stated angle as shown in FIG. 1. Leg 3 includes an integrally connected narrow plate 4 that is oriented vertically and inwardly, which extends a major portion of the length of leg 3, and the free vertical edge of which is positioned a short and overall equal distance 5 from the interior surface of the other leg 2.

Leg 3 extends following the curve of resilient bight portion 6 of the wedge, which connects leg members 2 and 3, so that by extending at the stated angle its outer surface is adapted for a full contact with the inside surface of the side wall of the pot 7 and this allows for secure positioning of the wedge, as will be apparent from the following description.

Figure 3:
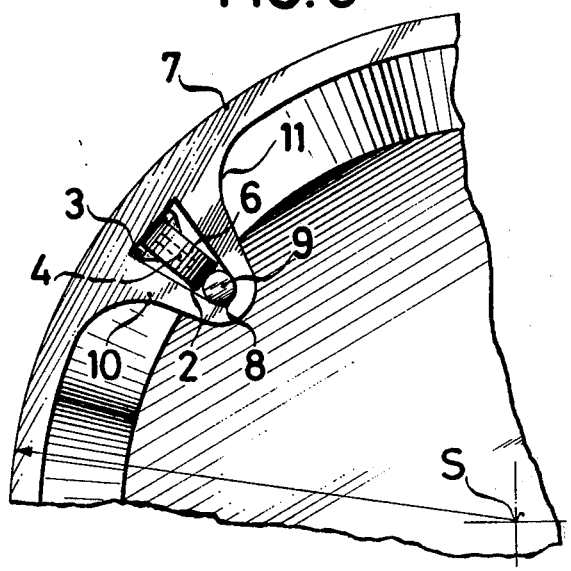
FIG. 3 is a top plan view of a fragmentary portion of a plant pot showing the rod support body portion formed integral with the plant pot and the springy wedge pushed into position after insertion of the support rod.

As shown in FIG. 3, a rod support body portion is formed integrally on the top inner edge of the plant pot 7 and extends downwardly into the pot a sufficient distance to form a sufficiently long support surface for the plant support rod 9. The rod support body portion consists of a pair of generally vertical side wall portions 10 and 11 extending radially inwardly from the inner side wall of the pot 7, in converging relation, and joined at their inner ends to form a fluted countersurface or groove 8 that extends generally parallel with the axis of symmetry S of the pot. Upstanding plant support rod 9 that protrudes high above the pot and which may extend to the bottom of the pot, if desired, for added support, and to which a plant in the pot is subsequently tied or connected for support, is positioned in the groove 8 and is anchored therein by pressure being applied evenly along the length of the rod in the area of the groove 8 by the outer surface of the wide leg 2 of the springy wedge member 1. The side wall portions 10 and 11, the inner downwardly and inwardly sloping surface of the pot 7, and the support groove 8 define a rigid enclosure that accommodates the plant support rod 9 and the springy wedge member 1 that constantly, resiliently wedges the rod 9 into the support groove 8 along the entire length of the groove. These members thus define a vertical channel through the rod support body portion, which channel has vertical side walls that converge inwardly of the pot toward the vertical support groove that forms the inner terminal wall, and which has an outer wall that slopes downwardly and inwardly.

The slope of the outer leg 3 and the side wall of the pot 7 are the same and the outer surface of outer leg 3 is adapted to contact throughout its length the sloping side wall of the pot and through the resilient bright portion 6 urges the full length of inner leg member 2 against the plant support rod 9 to wedge the rod into groove 8, since the rod 9 is positioned between the groove or channel 8 and the resilient wedge 1. Support rods 9 of various diameters and cross-sections can be placed in groove 8 and springy wedge will securely hold it in the groove.

If the diameter or width of the support rod 9 is greater than that shown in the drawings so as to take up more of the radial length of the vertical channel when viewed in top plan, then as the wedge member 1 is inserted into the top of the vertical channel and pushed down, outer leg member 3 moves toward inner leg member 2 so that the vertical edge of narrow plate 4 contacts throughout its length the inner surface of inner leg member 2. The wedge member thus becomes a rigid wedge in this instance.

Figure 2:
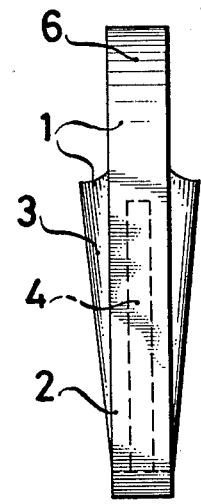
FIG. 2 is a view of the springy wedge as seen from the left in FIG. 1 or from inside the pot.

Outer leg 3, as shown particularly in FIG. 2, has side extensions thereon so that when viewed from the side edge, the side edges of leg 3 are upwardly diverging and terminate in an upper leg width greater than the width of leg 2, just below bight portion 6. This aids in centering and stabilizing the wedge member between side wall portions 10 and 11 since the inside distance between these walls in the area of leg 3 is greater than it is in the area of leg 2.

Figure 4:
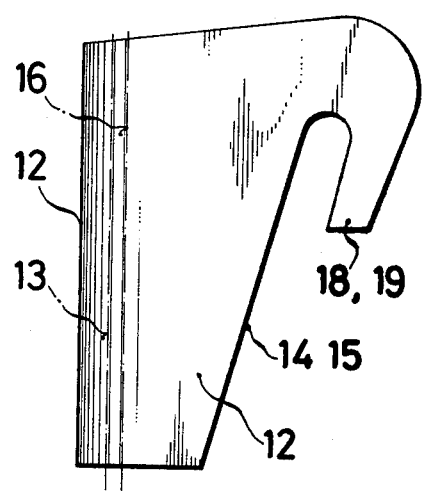
FIG. 4 is a side elevational view of a modified form of the rod support body portion for connection over the rim of a common plant pot.
Figure 5:
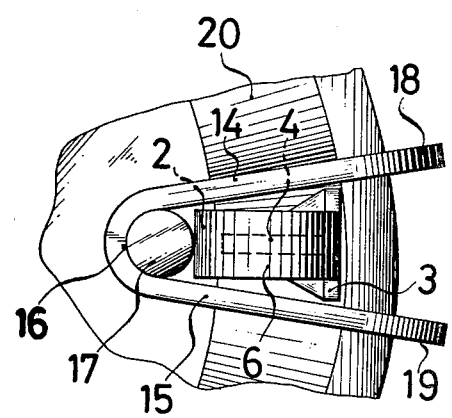
FIG. 5 is a top plan view showing the rod support body portion of FIG. 4 in position on a fragmentary portion of a plant pot with the springy wedge holding the support rod in position.
Figure 6:
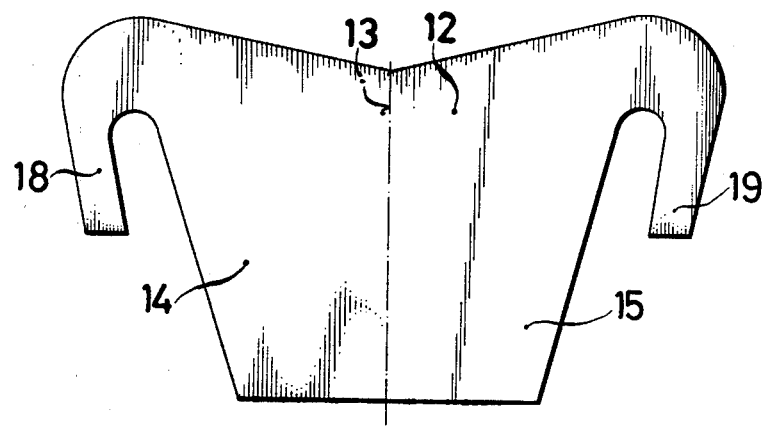
FIG. 6 is a plan view of the rod support body portion of FIG. 5 formed as a stamping piece before bending it into an angular part as per FIG. 5.

If the use of common plant pots is preferred, then the modified form of rod support body portion 12 as shown in FIGS. 4–6 is used. The rod support body portion is formed as a flat stamping as shown in FIG. 6, which is bent along line 13 in such a way that side wall portion 14 and 15, which are comparable to side wall portions 10 and 11, form an acute angle with respect to each other, and at the bend form a vertical support groove or channel 16 for the support rod 17. U-shaped cut-out ends or hook shaped ends 18 and 19 on the top outer edges of side wall portions 14 and 15 fit over the widened rim of plant pot 20 and thus hold rod support body portion 12 tightly in any desired position around the pot against downward and radial inward movements transferred to it by plant support stresses on the support rod 17. The cooperation between the wedge member and the rod support body portion 12 is the same as in the preferred form of the invention. In both forms of the invention, the vertical rod support groove or channel 8,16, and the legs of the wedge member are of sufficient length to provide adequate support for the upstanding support rod and usually are at least one and one-half the radial width of the same.

The described parts can be produced by the injection-centrifugal casting method, or the like, of thermoplastic synthetic material that does not emit any solvents or harmful particles into the plant soil.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A support device for a potted plant support rod in a plant pot comprising,
   a rod support body portion extending inwardly from the top rim portion of a plant pot,
   the plant pot having a vertical axis of symmetry, said rod support body portion having a channel therethrough bounded at the inner end by a support groove substantially parallel with the axis of symmetry of the plant pot and at the outer end by the inner side of the plant pot, an upstanding plant support rod adapted to be positioned in said support groove, separate wedge means for insertion in said channel from the top thereof between said support rod and the inner side of the plant pot to anchor said support rod in said support groove, said separate wedge means comprising a pair of spaced leg portions one of which is adapted to engage the inner side of the plant pot and the other of which is adapted to engage said support rod, and a resilient bight portion connecting said pair of leg portions at the tops thereof and biasing said pair of leg portions away from one another.

2. A support device as set forth in claim 1, in which said rod support body portion includes a pair of side wall portions forming the sides of said channel.

3. A support device as set forth in claim 2, in which said pair of side wall portions converge radially inwardly toward each other.

4. A support device as set forth in claim 2, in which said pair of side wall portions are integrally connected to the top rim portion of said plant pot.

5. A support device as set forth in claim 2, in which said pair of side wall portions include hook means on the outer edges thereof removably engaged over the top rim portion of the plant pot.

6. A support device as set forth in claim 5, in which the outer edges of said pair of side wall portions have the same angle relative to the axis of symmetry of said plant pot as the inner side of the plant pot, and said outer edges removably engage the inner side of the plant pot.

7. A support device as set forth in claim 5, in which said rod support body portion is formed from a planar stamping including said pair of side wall portions and hook means in the same plane, said pair of side wall portions being bent toward each other at acute angles forming said support groove therebetween.

8. A support device as set forth in claim 1, in which said pair of spaced leg portions have axes oriented toward each other at an acute angle corresponding to the angle of the slant of the inner side of the plant pot relative to the axis of symmetry of the plant pot.

9. A support device as set forth in claim 8, including a plate body portion connected to one leg portion of said pair of spaced leg portions and extending toward the other leg portion, said plate body having a free edge spaced from and adapted to engage said other leg portion.

10. A support device as set forth in claim 9, in which said plate body portion is connected to the leg portion which is adapted to engage the inner side of the plant pot, said plate body portion connected substantially at right angles to said leg portion and extending a major portion of the length thereof.

* * * * *